(12) United States Patent
Hosotani

(10) Patent No.: US 11,916,485 B2
(45) Date of Patent: Feb. 27, 2024

(54) POWER SUPPLY SYSTEM

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 248 days.

(21) Appl. No.: 17/647,267

(22) Filed: Jan. 6, 2022

(65) Prior Publication Data

US 2022/0131467 A1 Apr. 28, 2022

Related U.S. Application Data

(63) Continuation of application No. PCT/JP2020/005053, filed on Feb. 10, 2020.

(30) Foreign Application Priority Data

Jul. 9, 2019 (JP) ................................ 2019-127566

(51) Int. Cl.
  *H02M 3/158* (2006.01)
  *H02M 1/00* (2006.01)

(52) U.S. Cl.
  CPC ....... *H02M 3/1586* (2021.05); *H02M 1/0009* (2021.05); *H02M 1/0083* (2021.05)

(58) Field of Classification Search
  CPC ............. H02M 3/1586; H02M 3/1584; H02M 1/0009; H02M 1/0083
  See application file for complete search history.

(56) References Cited

U.S. PATENT DOCUMENTS

| | | | | |
|---|---|---|---|---|
| 6,215,290 B1* | 4/2001 | Yang | .................... | H02M 3/1584 323/290 |
| 6,534,960 B1* | 3/2003 | Wells | .................. | H02M 3/1584 323/284 |
| 10,511,226 B1* | 12/2019 | Gurlahosur | ......... | H02M 3/1582 |
| 2006/0212138 A1* | 9/2006 | Zhang | ................. | H02M 3/1584 713/300 |

(Continued)

FOREIGN PATENT DOCUMENTS

| | | |
|---|---|---|
| JP | 2001-025239 A | 1/2001 |
| JP | 2001-286135 A | 10/2001 |

(Continued)

OTHER PUBLICATIONS

International Search Report issued in PCT/JP2020/005053; dated Mar. 31, 2020.

(Continued)

*Primary Examiner* — Rafael O De Leon Domenech
(74) *Attorney, Agent, or Firm* — Studebaker & Brackett PC

(57) ABSTRACT

A power supply system includes a plurality of power conversion circuits, each including an inductor and switching elements. A load distribution controller amplifies an inductor current signal input to a current signal terminal, outputs the amplified signal to a common node terminal, and generates an individual feedback signal to be output to a feedback signal adjustment terminal according to an inductor current signal and a voltage of the common node terminal. A switching control circuit controls the switching elements according to the individual feedback signal input to a feedback terminal.

12 Claims, 4 Drawing Sheets

(56) References Cited

U.S. PATENT DOCUMENTS

| | | | |
|---|---|---|---|
| 2006/0239046 A1 | 10/2006 | Zane et al. | |
| 2012/0086416 A1* | 4/2012 | Kudo | G06F 1/26 |
| | | | 323/265 |
| 2014/0375288 A1* | 12/2014 | Nora | H02J 1/102 |
| | | | 323/272 |
| 2015/0115910 A1* | 4/2015 | Jiang | H02M 3/1584 |
| | | | 323/271 |
| 2016/0233766 A1* | 8/2016 | Todorov | H02M 3/1584 |
| 2017/0063239 A1* | 3/2017 | Wu | H02M 3/1584 |
| 2019/0074770 A1* | 3/2019 | Trichy | H02M 3/1584 |
| 2019/0140554 A1* | 5/2019 | Cummings | H02M 1/14 |
| 2021/0305899 A1* | 9/2021 | Hsieh | H02M 1/0035 |

FOREIGN PATENT DOCUMENTS

| | | | |
|---|---|---|---|
| JP | 2004-266954 A | 9/2004 | |
| JP | 2011-147269 A | 7/2011 | |
| JP | 2012-080769 A | 4/2012 | |
| JP | 2012-120355 A | 6/2012 | |
| JP | 2013-094058 A | 5/2013 | |

OTHER PUBLICATIONS

Written Opinion of the International Searching Authority issued in PCT/JP2020/005053; dated Mar. 31, 2020.

\* cited by examiner

POWER SUPPLY SYSTEM

CROSS-REFERENCE TO RELATED APPLICATIONS

This application claims benefit of priority to International Patent Application No. PCT/JP2020/005053, filed Feb. 10, 2020, and to Japanese Patent Application No. 2019-127566, filed Jul. 9, 2019, the entire contents of each are incorporated herein by reference.

BACKGROUND

Technical Field

The present disclosure relates to a power supply system including a plurality of power conversion circuits.

Background Art

In general, in a power supply system for supplying a large amount of power, there is a means formed of a large-scale power conversion circuit using power components having a large current capacity. However, in such a large-scale power conversion circuit, there is a problem in that power components are large and occupy a large volume in practical use, and the large-scale power conversion circuit increases in size. In addition, power loss is concentrated on the power components, which causes a decrease in reliability.

As a means for solving the above-described problem, a power supply system in which a plurality of power conversion circuits is operated in parallel has been developed, as described in Japanese Unexamined Patent Application Publication No. 2011-147269 and Japanese Unexamined Patent Application Publication No. 2013-94058. As described above, when a plurality of power conversion circuits is operated, an output current handled by one power conversion circuit is reduced, Joule loss is reduced, and high efficiency is achieved. In addition, since the power loss is dispersed, heat is dispersed and the power supply system can be miniaturized.

SUMMARY

In order to realize output voltage control and current balance control with high-speed response in a power supply system including a plurality of power conversion circuits, a simple, compact, and high-performance switching control circuit is required.

In general, a digital control circuit using a DSP (digital signal processor) or the like is used. A method using such a digital control circuit has an advantage of programmable setting, but requires a large-scale processor for realizing high-speed processing. Further, digital control requires a specific data processing speed, and it is very difficult to realize high-speed response output voltage control. In addition, a plurality of AD converters is required to convert analog values of current and voltage in the power conversion circuit into digital values, and it is difficult to construct a simple and compact control circuit.

As another implementation means, there is a method using an integrated analog control IC. The method using the analog control IC has an advantage that even a complicated control circuit can be integrated and miniaturized, but the number of applicable power supply systems is small and the production amount is small. For this reason, the analog control IC is often designed in a dedicated custom manner, the development cost is enormous, requirement for mass production is large, and there is a problem in that the unit cost of the analog control IC is increased.

Therefore, the present disclosure provides a simple, compact, and highly efficient power supply system including a plurality of power conversion circuits, in which power supply system is realized for simultaneously realizing high-speed response output voltage control to stabilize a common output voltage at high speed with respect to load fluctuation and for current balance control to equalize currents flowing through inductors of the plurality of power conversion circuits to disperse power loss.

A power supply system as an example of the present disclosure, which is a power supply system including a plurality of power conversion circuits each including an inductor connected in series to a current path for supplying a current to an output, and a switching element that generates a switching current flowing through the inductor, includes an individual current detection circuit provided for each of the power conversion circuits and configured to generate an inductor current signal proportional to a magnitude of a current flowing through the inductor; and an integrated individual current balance circuit provided for each of the power conversion circuits and having at least a current signal terminal, a common node terminal, and a feedback signal adjustment terminal. The power supply system further includes an integrated individual switching control circuit provided for each of the power conversion circuits, having a feedback terminal that inputs at least a feedback signal, and configured to generate a control signal for the switching element; a common output portion configured to merge output currents of the plurality of power conversion circuits; and a current sharing signal line that connects the common node terminals of the plurality of power conversion circuits, in which the individual current balance circuit outputs the inductor current signal input to the current signal terminal to the common node terminal and generates an individual feedback signal to be output to the feedback signal adjustment terminal according to the inductor current signal and a voltage of the common node terminal, and the individual switching control circuit equalizes currents flowing through respective inductors of the plurality of power conversion circuits by controlling the switching element in accordance with the individual feedback signal input to the feedback terminal, and controls a voltage of the common output portion to a constant voltage value to be stabilized.

According to the above configuration, the currents flowing through respective inductors of the plurality of power conversion circuits are equalized and the voltage of the common output portion is stabilized by using a highly versatile analog control IC without using a custom-designed analog integrated circuit dedicated to multiphase (polyphase oscillation).

According to the present disclosure, in a power supply system including a plurality of power conversion circuits, it is possible to obtain a simple, compact, and highly efficient power supply system that simultaneously realizes high-speed response output voltage control for controlling a common output voltage to a constant voltage value to be stabilized with respect to load fluctuation at high speed, and current balance control for equalizing currents flowing through inductors of the plurality of power conversion circuits to disperse power loss.

DETAILED DESCRIPTION

Figure 1:
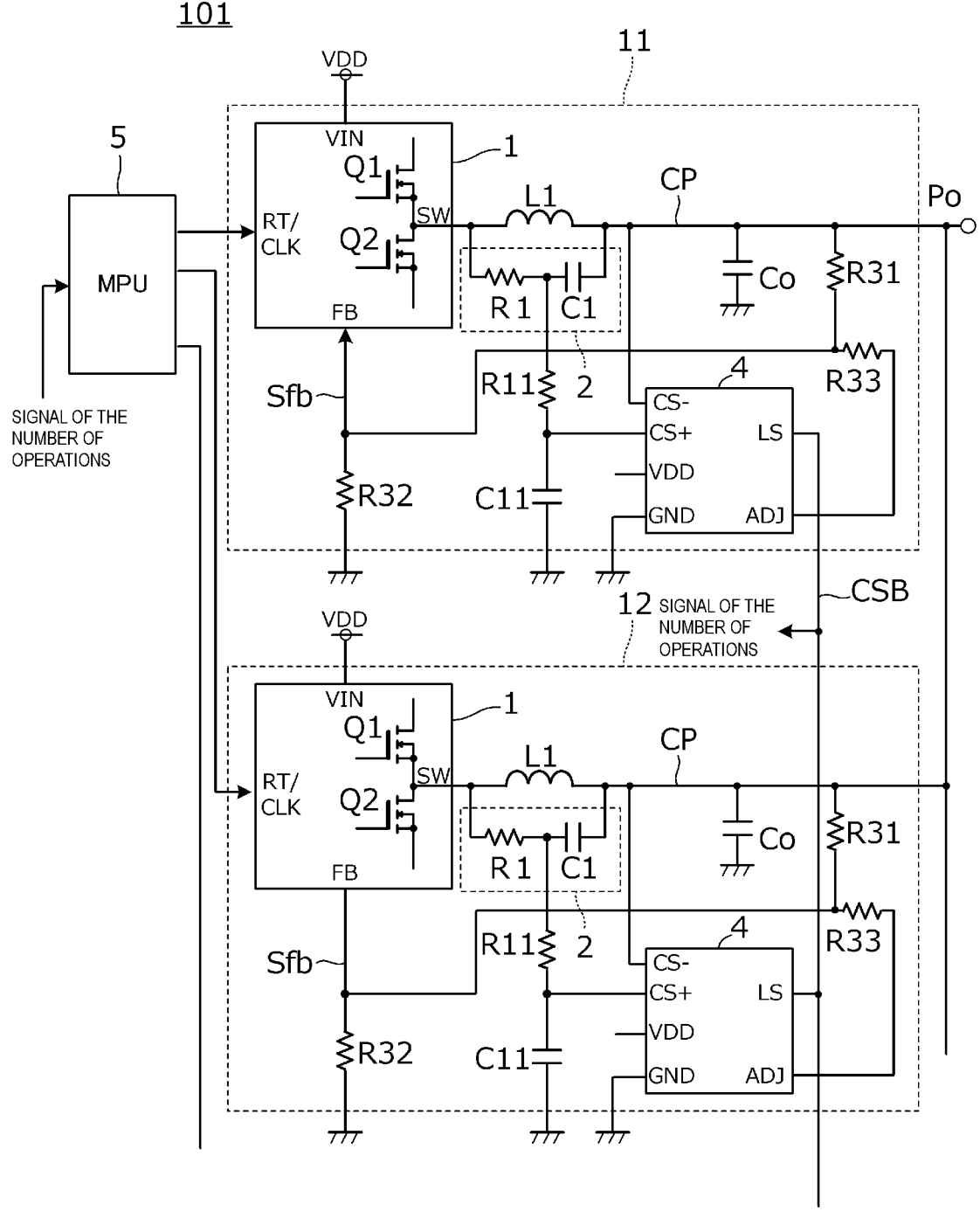
FIG. 1 is a circuit diagram of a multiphase (polyphase oscillation) power supply system according to an embodiment of the present disclosure.

FIG. 1 is a circuit diagram of a multiphase (polyphase oscillation) power supply system according to the present embodiment. A multiphase power supply system 101 includes a microprocessor 5 and a plurality of cell converters such as cell converters 11 and 12. VDD is a power supply voltage terminal, and GND is a ground terminal.

Each cell converter such as the cell converters 11 and 12 includes a switching control circuit 1, an inductor L1, capacitors Co and C11, an inductor current detection circuit 2, a load distribution controller 4, and resistance elements R11, R31, R32, and R33. Here, the cell converters 11 and 12 correspond to a "power conversion circuit" in the present disclosure. The switching control circuit 1 corresponds to an "individual switching control circuit" in the present disclosure. The inductor current detection circuit 2 corresponds to an "individual current detection circuit" in the present disclosure. In addition, the load distribution controller 4 corresponds to an "individual current balance circuit" in the present disclosure.

The microprocessor 5 determines the number of cell converters to be operated according to a signal of the number of operations, and applies a multiphase oscillation signal to an RT/CLK terminal of the cell converter. The voltage of a current sharing signal line (current share bus) CSB of the load distribution controller 4 is a voltage corresponding to the number of cell converters in operation. A part of the microprocessor 5 corresponds to a "multiphase oscillation signal circuit" in the present disclosure.

Switching elements Q1 and Q2 are provided at an output stage of the switching control circuit 1. The inductor L1 is connected in series with a current path CP for supplying a current to a common output portion Po. The capacitor Co is connected in parallel with the common output portion Po (between the voltage output terminal of the common output portion Po and the ground). The switching elements Q1 and Q2 generate a switching current flowing through the inductor L1. The switching control circuit 1 controls switching of the switching elements Q1 and Q2 by using a voltage of a VIN terminal as a power supply voltage. The inductor current detection circuit 2 detects a current flowing through the inductor L1.

The switching control circuit 1 stabilizes the output voltage by performing switching control of the switching elements Q1 and Q2 so that the output voltage of the resistance voltage dividing circuit by the resistance elements R31 and R32 becomes constant.

The inductor current detection circuit 2 is configured of a time constant circuit including a detection capacitor C1 and a detection resistor R1 connected in series. The inductor current detection circuit 2 is connected in parallel to the inductor L1. As described below, the inductor current detection circuit 2 outputs the voltage across the detection capacitor C1 as a proportional value of the inductor current.

Figure 2:
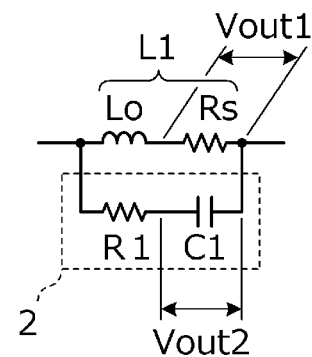
FIG. 2 is a partial circuit diagram in which an inductor illustrated in FIG. 1 is represented by an inductance and an equivalent series resistance.

FIG. 2 is a partial circuit diagram in which the inductor L1 illustrated in FIG. 1 is represented by an inductance Lo and an equivalent series resistance Rs. A time constant of the inductor current detection circuit 2 (of the time constant circuit) has a predetermined relationship with respect to values of the inductance Lo and the equivalent series resistance Rs of the inductor L1. Here, when a value of the inductance Lo is represented by Lo, a resistance value of the equivalent series resistance Rs is represented by Rs, a capacitance of the detection capacitor C1 is represented by Ct, and a resistance value of the detection resistor R1 is represented by Rt, the following relationship: Lo/Rs=CtRt is satisfied. Here, Lo/Rs can be referred to as a time constant of the inductor L1, and CtRt can be referred to as a time constant of the inductor current detection circuit 2. That is, when the resistance value Rt of the detection resistor R1 and the resistance value of the equivalent series resistance Rs of the inductor L1 are constant, the voltage across the detection capacitor C1 is proportional to the current flowing through the inductor L1, as described in Japanese Unexamined Patent Application Publication No. 2011-147269.

Figure 3:
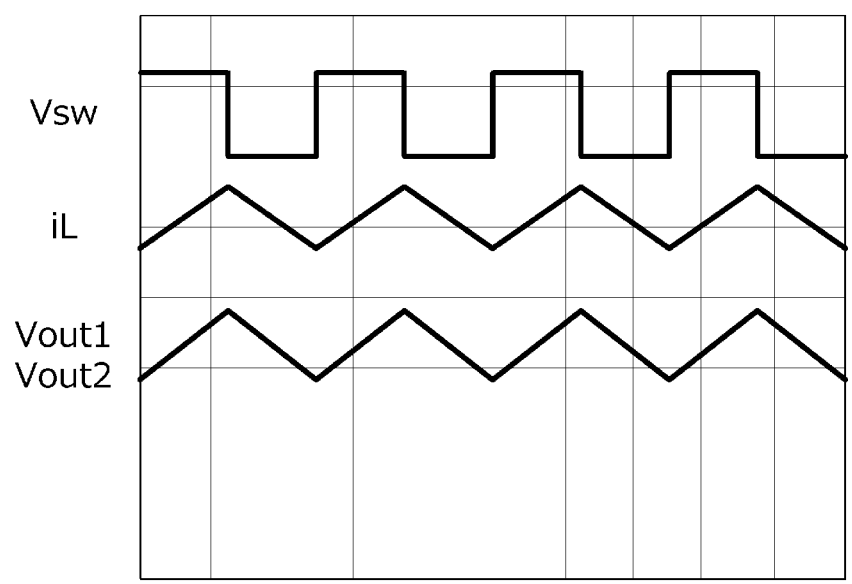
FIG. 3 is a waveform diagram obtained by simulating the voltage and current of each part illustrated in FIG. 2.

FIG. 3 is a waveform diagram obtained by simulating the voltage and current of each part illustrated in FIG. 2. In FIG. 3, a waveform Vsw is a waveform of a drain-source voltage of the low-side switching element Q2. A waveform iL is a waveform of a current flowing through the inductor L1. A waveform Vout1 is a waveform of a voltage across the equivalent series resistance Rs, and a waveform Vout2 is a waveform of an output voltage of the inductor current detection circuit 2. The waveform Vout1 and the waveform Vout2 completely overlap each other and appear as one.

Returning to FIG. 1, in the voltage across the detection capacitor C1 of the inductor current detection circuit 2, noise is removed by a low-pass filter formed by the resistance element R11 and the capacitor C11, thereby obtaining a voltage signal proportional to the average value of the inductor current to be input to CS+ and CS− terminals of the load distribution controller 4. The CS+ and CS− terminals correspond to a "current signal terminal" in the present disclosure. The load distribution controller 4 detects the inductor current and generates a voltage signal (current feedback signal) proportional to the magnitude of the current flowing through the inductor L1. This current feedback signal, which is obtained by being combined via the resistance element R33 with respect to the resistance voltage dividing circuit formed by the resistance elements R31 and R32, is input to a feedback terminal FB of the switching control circuit 1 as an individual feedback signal Sfb.

A common node terminal LS of each load distribution controller 4 is connected to a current sharing signal line CSB, and applies a feedback signal to the switching control circuit 1 so that load factors, which is a distribution ratio at which the operating cell converter such as the cell converters 11 and 12 supplies a current to a load, are equal to each other. That is, the load distribution controller 4 inputs the output voltage of the inductor current detection circuit 2 and outputs feedback signals to the switching control circuit 1 so that the inductor currents of the two cell converters 11 and 12 are equal to each other.

As the load factor of the cell converter is lower than that of other cell converters, the output voltage of the above-described resistance voltage dividing circuit is lowered by the above-described current feedback signal (current is drawn from the resistance voltage dividing circuit to the feedback signal adjustment terminal (ADJ)). In a case where only the voltage feedback signal from the resistance voltage dividing circuit formed by the resistance elements R31 and R32 is fed back to the switching control circuit 1, the output voltage of the common output portion Po is only controlled to be a constant voltage, but the individual feedback signal is fed back to the switching control circuit 1, whereby as the load factor of the cell converter is lower, the voltage of the individual feedback signal is reduced and an output current of the common output portion Po from the cell converter is increased.

By feeding back the individual feedback signal in this manner, the load factors of the cell converters in operation are averaged and equalized. The output current handled by each cell converter is reduced, so that a Joule loss is reduced to improve efficiency. Further, since the power loss is dispersed, the heat can be dispersed and the size can be reduced. Further, by the multiphase operation, an apparent switching frequency is increased, a smoothing circuit for smoothing the switching current can be miniaturized, and the size of the power supply system can be reduced.

As the switching control circuit 1, for example, a general-purpose analog control IC for a step-down converter or the like can be employed.

Figure 4:
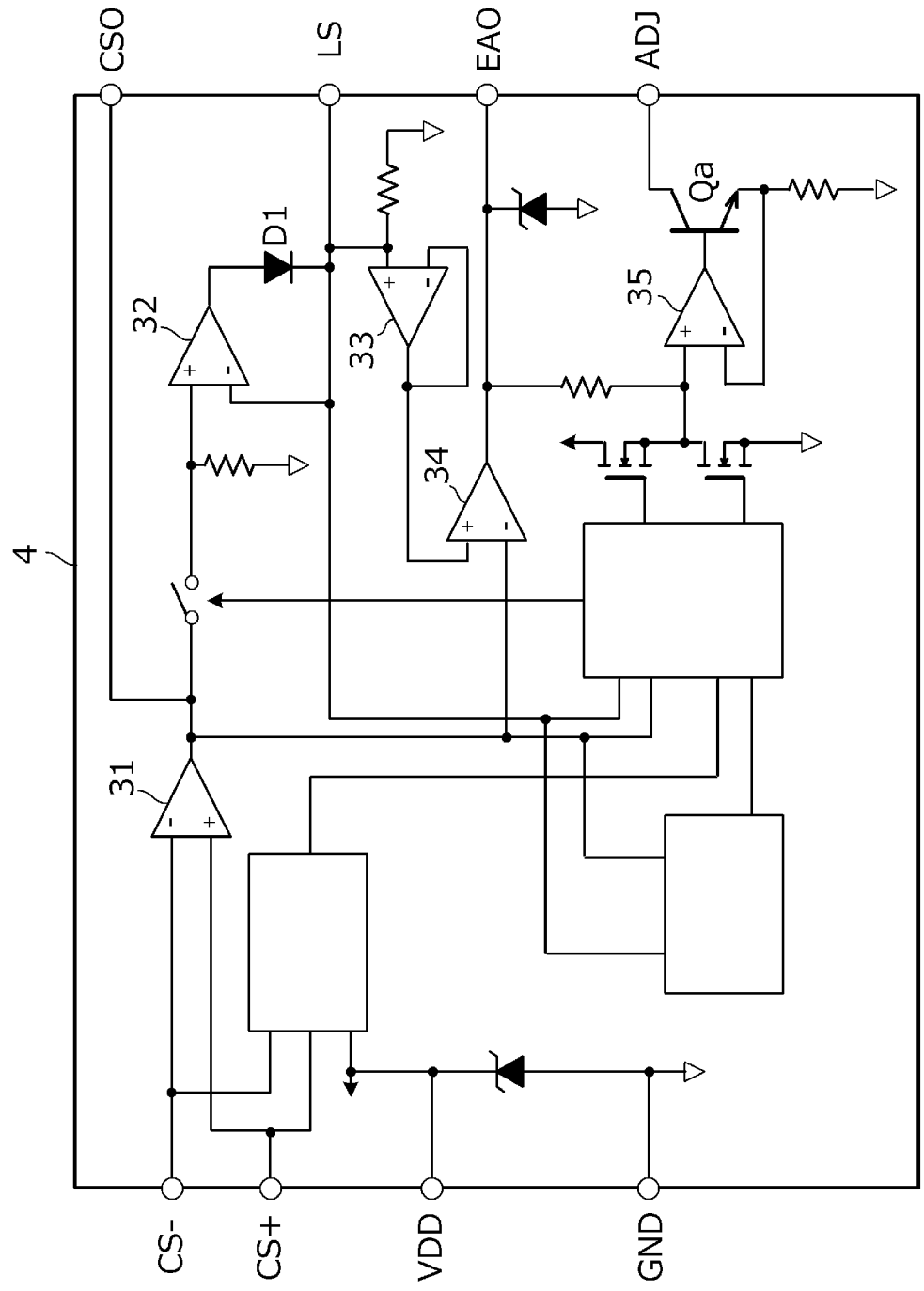
FIG. 4 is a block diagram illustrating an internal circuit configuration of a load distribution controller.

Next, an internal configuration of the load distribution controller 4 will be described. FIG. 4 is a block diagram illustrating an internal circuit configuration of the load distribution controller 4. A current detection amplifier 31 amplifies a voltage input to the CS+ and CS− terminals. A CSO terminal is a terminal for outputting an output voltage of the current detection amplifier 31. A current share bus driver 32 amplifies the output voltage of the current detection amplifier 31 and outputs the amplified voltage to the common node terminal LS. A current share bus receiver 33 inputs the voltage of the common node terminal LS with high impedance. A current error amplifier 34 amplifies the difference between the output voltage of the current detection amplifier 31 and the voltage of the common node terminal LS. An adjustment amplifier 35 and a transistor Qa draw a current from a feedback signal adjustment terminal ADJ in response to an output voltage of the current error amplifier 34. An EAO terminal is a terminal for outputting the output voltage of the current error amplifier 34. As the load distribution controller 4, for example, an analog control IC or the like of a general-purpose load distribution controller having a parallel redundant configuration configured to equalize DC output currents of a plurality of converters can be employed.

In the example illustrated in FIG. 4, since the common node terminal LS is connected to the output of the current share bus driver 32 via a diode D1, the highest voltage of the common node terminal LS of the load distribution controller 4 connected to the current sharing signal line CSB is the voltage of the current sharing signal line CSB. Therefore, the output currents of the other cell converters are controlled to increase so as to follow the maximum current value of the currents output from the plurality of cell converters. In FIG. 4, a circuit portion including the current share bus driver 32 and the diode D1 corresponds to a "maximum current following circuit" of the present disclosure. With such a configuration, when the load current rapidly increases, the plurality of other cell converters other than the cell converter that outputs the maximum current rapidly increases the output current, and thus high responsiveness is obtained.

Figure 5:
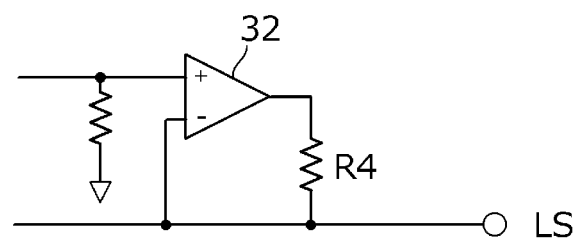
FIG. 5 is a partial circuit diagram of a load distribution controller partially different in configuration from the load distribution controller illustrated in FIG. 4.

FIG. 5 is a partial circuit diagram of a load distribution controller partially different in configuration from the load distribution controller 4 illustrated in FIG. 4. Unlike the example illustrated in FIG. 4, the output of the current share bus driver 32 is connected to the common node terminal LS via a resistance element R4.

According to the load distribution controller illustrated in FIG. 5, the common node terminal LS of the plurality of cell converters is connected to the current sharing signal line CSB, so that the voltage of the current sharing signal line CSB becomes an average value of the output voltages of the current share bus drivers 32 of the plurality of cell converters. Therefore, the output current of each cell converter is controlled so that the output current of the plurality of cell converters follows an average current value. In FIG. 5, a circuit portion including the current share bus driver 32 and the resistance element R4 corresponds to an "average current following circuit" in the present disclosure. According to such a configuration, the diode D1 illustrated in FIG. 4 is not necessary, and there is no temperature dependence due to the diode, so that high stability with respect to changes in temperature can be obtained.

Finally, the description of the above-described embodiment is in all respects illustrative and not restrictive. Variations and modifications can be made by those skilled in the art as appropriate. The scope of the present disclosure is indicated by the appended claims rather than by the foregoing embodiment. Further, the scope of the present disclosure includes changes from the embodiments within the scope equivalent to the claims.

What is claimed is:

1. A power supply system comprising:
   a plurality of power conversion circuits, each including an inductor connected in series to a current path configured to supply a current to an output;
   a switching element configured to generate a switching current flowing through the inductor;
   an individual current detection circuit provided for each of the power conversion circuits and configured to generate an inductor current signal proportional to a magnitude of a current flowing through the inductor;
   an integrated individual current balance circuit provided for each of the power conversion circuits and having at least a current signal terminal, a common node terminal, and a feedback signal adjustment terminal;
   an integrated individual switching control circuit provided for each of the power conversion circuits, having a feedback terminal that inputs at least a feedback signal, and configured to generate a control signal for the switching element;
   a common output portion configured to merge output currents of the plurality of power conversion circuits; and
   a current sharing signal line that connects the common node terminals of the plurality of power conversion circuits,
   wherein
   the individual current balance circuit is configured to output the inductor current signal input to the current signal terminal to the common node terminal and generate an individual feedback signal output to the feedback signal adjustment terminal according to the inductor current signal and a voltage of the common node terminal, and
   the individual switching control circuit is configured to equalize currents flowing through respective inductors of the plurality of power conversion circuits by controlling the switching element in accordance with the individual feedback signal input to the feedback terminal, and controls a voltage of the common output portion to a constant voltage value to be stabilized.

2. The power supply system according to claim 1, wherein the individual switching control circuit includes the switching element.

3. The power supply system according to claim 1, further comprising:
a multiphase oscillation signal circuit configured to generate a multiphase oscillation signal to be applied to each of the individual switching control circuits is included, and
wherein
the plurality of power conversion circuits operates in multiphase form.

4. The power supply system according to claim 1, wherein the individual current balance circuit includes a maximum current following circuit configured to output a voltage signal following a maximum current value to the current sharing signal line.

5. The power supply system according to claim 1, wherein the individual current balance circuit includes an average current following circuit configured to output a voltage signal following an average current value to the current sharing signal line.

6. The power supply system according to claim 2, further comprising:
a multiphase oscillation signal circuit configured to generate a multiphase oscillation signal to be applied to each of the individual switching control circuits is included, and
wherein
the plurality of power conversion circuits operates in multiphase form.

7. The power supply system according to claim 2, wherein the individual current balance circuit includes a maximum current following circuit configured to output a voltage signal following a maximum current value to the current sharing signal line.

8. The power supply system according to claim 3, wherein the individual current balance circuit includes a maximum current following circuit configured to output a voltage signal following a maximum current value to the current sharing signal line.

9. The power supply system according to claim 6, wherein the individual current balance circuit includes a maximum current following circuit configured to output a voltage signal following a maximum current value to the current sharing signal line.

10. The power supply system according to claim 2, wherein
the individual current balance circuit includes an average current following circuit configured to output a voltage signal following an average current value to the current sharing signal line.

11. The power supply system according to claim 3, wherein
the individual current balance circuit includes an average current following circuit configured to output a voltage signal following an average current value to the current sharing signal line.

12. The power supply system according to claim 6, wherein
the individual current balance circuit includes an average current following circuit configured to output a voltage signal following an average current value to the current sharing signal line.

* * * * *